(12) United States Patent
Tsuge et al.

(10) Patent No.: US 8,996,149 B2
(45) Date of Patent: Mar. 31, 2015

(54) PORTABLE RADIO SETS

(75) Inventors: Kazunori Tsuge, Anjo (JP); Yuuta Matsuura, Anjo (JP)

(73) Assignee: Makita Corporation, Anjo-Shi (JP)

( * ) Notice: Subject to any disclaimer, the term of this patent is extended or adjusted under 35 U.S.C. 154(b) by 215 days.

(21) Appl. No.: 13/533,591

(22) Filed: Jun. 26, 2012

(65) Prior Publication Data

US 2013/0006405 A1 Jan. 3, 2013

(30) Foreign Application Priority Data

Jun. 30, 2011 (JP) ................................ 2011-145360

(51) Int. Cl.
*G06F 17/00* (2006.01)
*H04B 1/08* (2006.01)
*G06F 1/16* (2006.01)

(52) U.S. Cl.
CPC ................ *H04B 1/08* (2013.01); *G06F 1/1628* (2013.01); *G06F 1/1632* (2013.01)
USPC ........................................... 700/94; 381/124

(58) Field of Classification Search
CPC .......... H04R 1/02; H04R 1/025; H04R 1/028; H04R 2205/021; H04R 5/02; G06F 1/1632; G06F 1/1628
See application file for complete search history.

(56) References Cited

U.S. PATENT DOCUMENTS

| 2005/0225288 | A1 | 10/2005 | Cole, Jr. et al. | |
|---|---|---|---|---|
| 2005/0254678 | A1* | 11/2005 | Wearing | ........................ 381/334 |
| 2008/0025544 | A1* | 1/2008 | Maldonado | .................... 381/334 |
| 2008/0266783 | A1* | 10/2008 | Mills et al. | ..................... 361/686 |
| 2009/0290745 | A1 | 11/2009 | Weir et al. | |

FOREIGN PATENT DOCUMENTS

| EP | 0 987 783 A2 | 3/2000 |
|---|---|---|
| JP | A-2000-200475 | 7/2000 |
| JP | A-2006-262529 | 9/2006 |
| WO | WO 2008/013973 A2 | 1/2008 |

OTHER PUBLICATIONS

Extended Search Report issued in European Patent Application No. 12173828.0 dated Jun. 13, 2013.
Office Action dated Jul. 29, 2014 issued in Japanese Patent Application No. 2011-145360 (with translation).

* cited by examiner

*Primary Examiner* — Joseph Saunders, Jr.
(74) *Attorney, Agent, or Firm* — Oliff PLC (57) ABSTRACT

Embodiments of the present invention may include a box-shaped housing having an upper face; a sound output device for reproducing sound; and an attachment device provided on the upper face of the housing and configured so that a portable audio player can be directly attached thereto. The attachment device allows the sound output device to communicate with the audio player attached thereto, whereby the sound output device can reproduce the sound data stored in the audio player as sound.

7 Claims, 13 Drawing Sheets

PORTABLE RADIO SETS

This application claims priority to Japanese patent application serial number 2011-145360, the contents of which are incorporated herein by reference.

BACKGROUND OF THE INVENTION

Field of the Invention

Embodiments of the present invention relate to portable radio sets having a sound output device.

At a job site such as a construction site, where power sources are not readily available, cordless electric tools powered by a rechargeable battery are often utilized. In order to enjoy music, radio programs, etc. during work, some workers may take a portable audio player to the job site such as a portable digital music player or a portable radio set. However, the job site where the electric tools are used is an environment where workers come and go and materials are often carried about, so that an ordinary portable audio player is likely to suffer damage from inadvertent contact with a worker, dropping of a material, etc., which means it is not fit for use in such an environment.

In view of this problem, there has conventionally been known a radio set powered by a battery for an electric tool. For example, US Patent Application Publication No. 2005/0225288 discloses such a radio set. The apparatus disclosed includes a box-like housing (10), and an audio unit (30) provided inside the housing, driven by a battery for an electric tool. The audio unit preferably has a radio set and a CD player. The housing is surrounded by and protected by a frame structure (20) formed through a combination of cylindrical rods (120), and the apparatus can be used while placed in a job site environment.

Further, on the left side (14) of the housing, the apparatus is preferably equipped with an external input terminal (83) connected to the above-mentioned audio unit; by connecting a separate portable audio player (160) to the external input terminal, it is possible to transfer and reproduce sound data such as music recorded in the portable audio player.

However, in connecting a portable audio player to the apparatus, it is necessary for the portable audio player to first be accommodated in a dedicated closed case (162) before attaching the closed case to the left side of the housing of the apparatus.

Therefore, there is a need in the art for facilitating the handling of a portable audio player including the attachment and detachment thereof to and from the housing.

SUMMARY OF THE INVENTION

Certain embodiments of the present invention include a portable radio set powered by a rechargeable battery for electric tools, and the radio set includes a housing of a box shape having an upper face, a sound output device reproducing sound, and an attachment device provided on the upper face of the housing. The attachment device is configured so that a portable audio player can be directly attached thereto, and the attachment device allows the sound output device to communicate with the audio player which is attached thereto, whereby the sound output device can reproduce the sound data stored in the audio player as sound.

Therefore, the audio player is situated on the upper face of the housing, which facilitates the handling of the portable audio player. This includes the attaching to and detaching from the connector.

DETAILED DESCRIPTION OF THE INVENTION

Each of the additional features and teachings disclosed above and below may be utilized separately or in conjunction with other features and teachings to provide improved portable radio sets. Representative examples of the present invention, which utilize many of these additional features and teachings both separately and in conjunction with one another, will now be described in detail with reference to the attached drawings. This detailed description is merely intended to teach a person of ordinary skill in the art further details for practicing preferred aspects of the present teachings and is not intended to limit the scope of the invention. Therefore, combinations of features and steps disclosed in the following detailed description may not be necessary to practice the invention in the broadest sense, and are instead taught merely to particularly describe representative examples of the invention. Moreover, various features of the representative examples and the dependent claims may be combined in ways that are not specifically enumerated in order to provide additional useful configurations of the present teachings.

Figure 2:
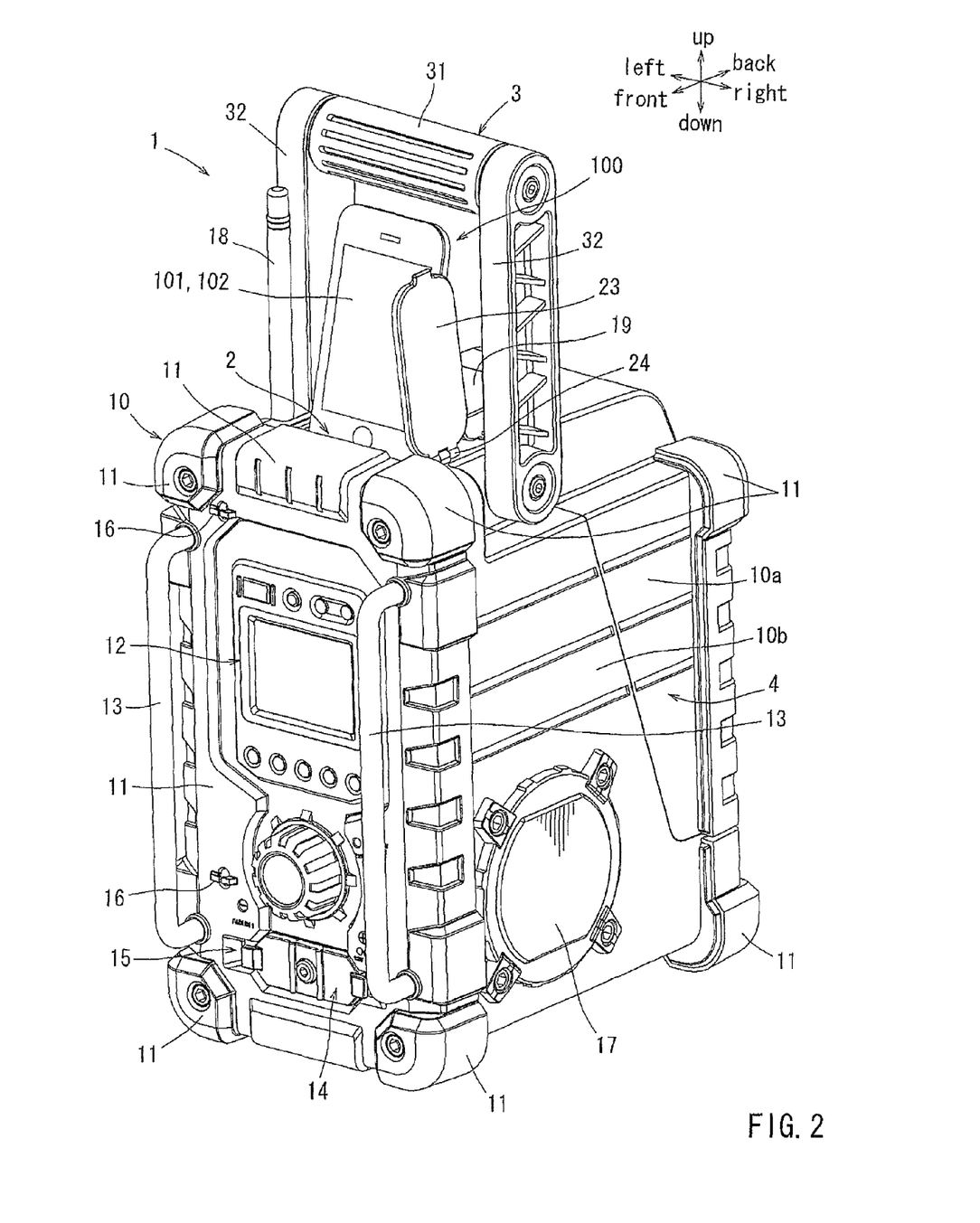
FIG. 2 is a perspective view of the housing with an iPod (registered trademark) attached on the upper face thereof.

In the following, a radio set 1 according to an embodiment will be described with reference to the drawings. The radio set 1 is, while used, usually placed on the floor, ground, etc. in a job site environment, such as one outdoors, where an electric tool is used. A rechargeable battery pack for the electric tool can be detachably mounted on the radio set 1 as a power source. On the other hand, as shown in FIG. 2, the radio set 1 may be provided with a handle 3 for carrying it about.

Figure 13:
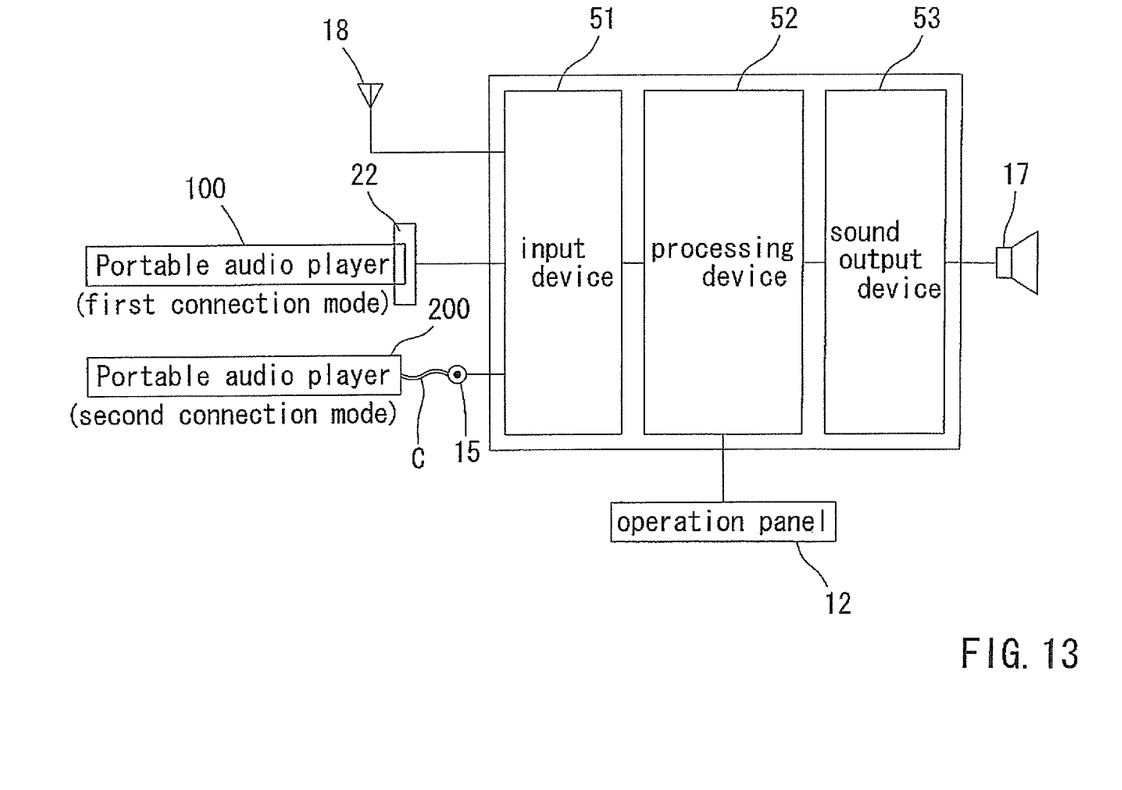
FIG. 13 is a schematic block diagram of the radio set.

As shown in FIG. 13, the radio set 1 is capable of connecting a separate portable audio player thereto. As a result, the radio set 1 not only functions as an ordinary radio set, which receives AM and FM broadcasts and reproduces it as sound through a sound output device 53, but also enables, through the same sound output device 53, reproduction of sound data such as music recorded within the portable audio player which is connected to the radio set 1.

The radio set 1 preferably has two modes of connecting a portable audio player thereto. In the first connection mode, a portable audio player 100 is preferably connected to a connector 22 provided on the upper face of the housing 10 without using a connecting cord. In this first connection mode, the audio player 100 is connected to the connector 22, whereby it is directly attached to the housing 10, the audio player 100 being used in this attachment state. In the second connection mode, a portable audio player 200 is connected to an external input terminal 15 on the lower portion of the front face of the housing 10 via a cord C. While used in the second connection mode, the audio player 200 is usually placed on the upper face of the housing 10. The two different audio players 100 and 200 can be simultaneously connected to the radio set 1 in the above two connection modes.

Figure 1:
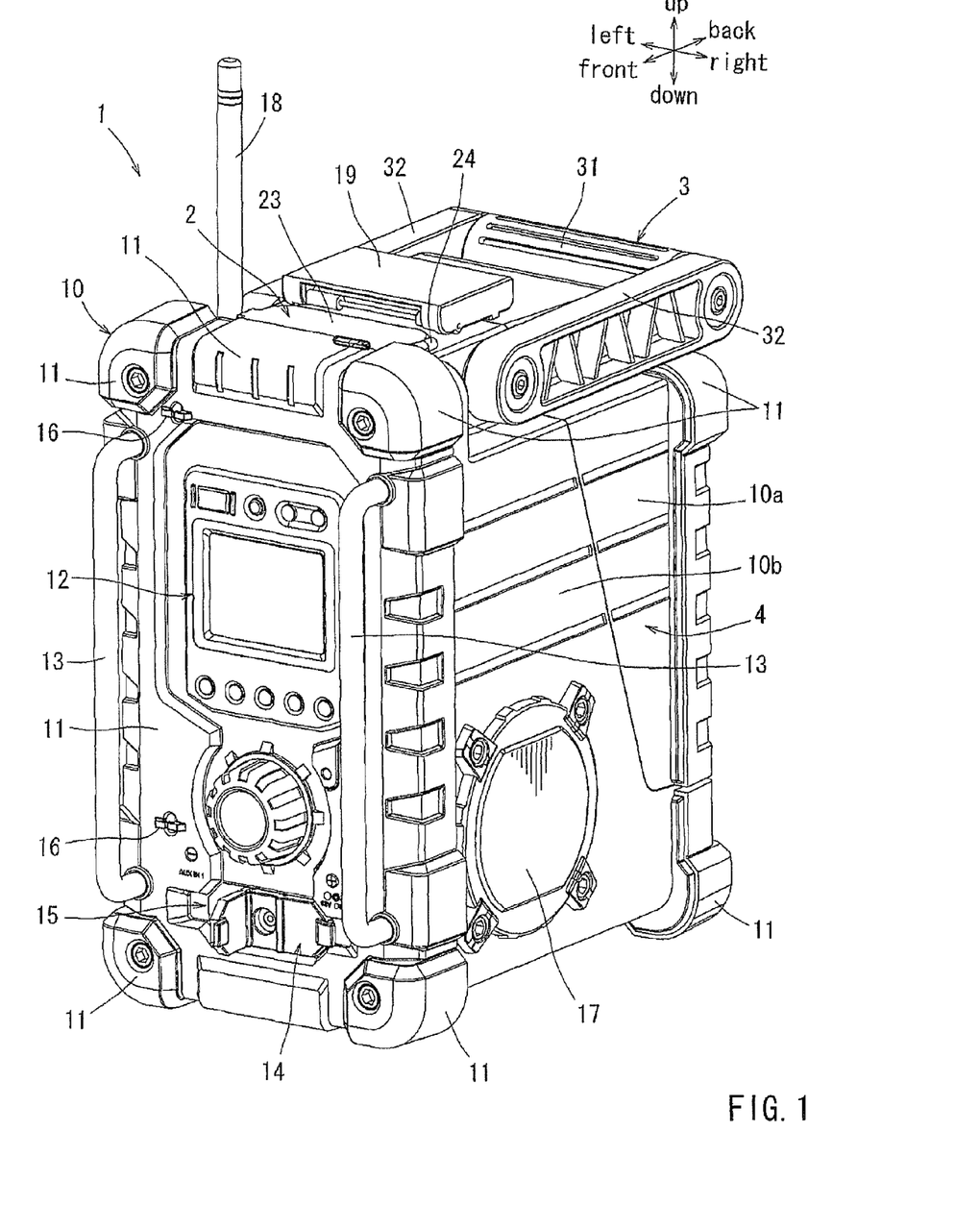
FIG. 1 is a perspective view of a portable radio set according to an embodiment of the present invention.
Figure 3:
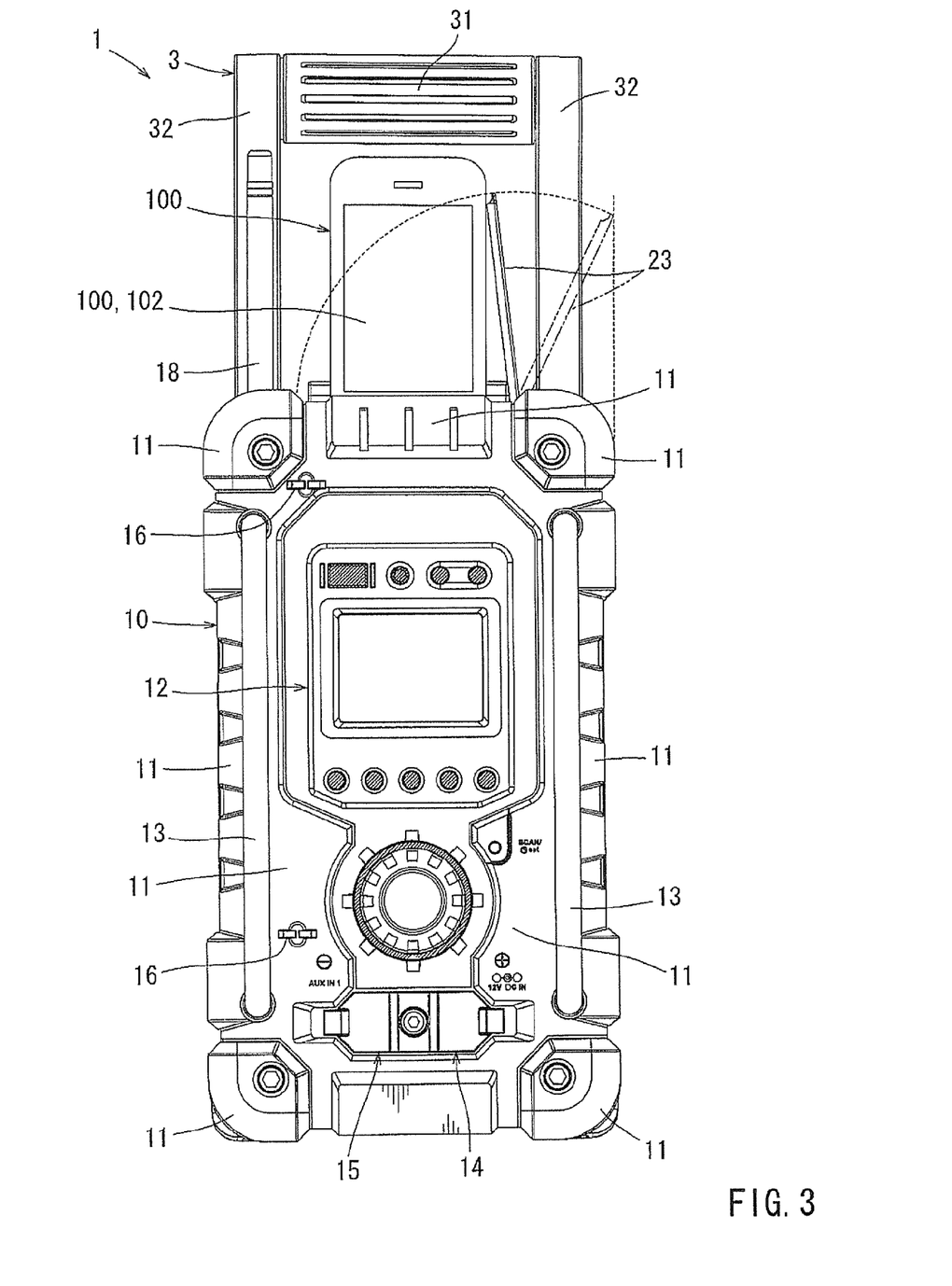
FIG. 3 is a front view of the housing, illustrating the range of opening and closing of the protective cover of the connector.

An embodiment of the radio set 1 of the present embodiment will be described in detail with reference to FIGS. 1 through 3. As shown in FIGS. 1 and 2, the radio set 1 is preferably equipped with a housing 10 generally formed in the shape of a box. The housing 10 can protect electrical systems inside, such as an inner circuit and a battery, from water and dust from the outside. Elastomer bumpers 11 may be configured around the housing 10 to absorb shock from the outside in order to protect the housing 10.

The front face (a left-hand side position as seen in FIG. 1) of the housing 10 preferably has an operation panel 12 thereon. The operation panel 12 preferably includes a display indicating a variety of information such as received radio frequency, and buttons arranged together around the display. The buttons preferably include a power button for turning power on/off, a tuning button, a volume control button, and a button for selecting functions between the radio and the external input. Alternatively, levers or switches normally used for making adjustments on an operation panel 12 may be used.

The front face of the housing 10 preferably has protective bars 13 mounted at the right and left positions thereon. The bars 13 are preferably formed of metal and spaced apart from the front face of the housing 10 in order to protect the operation panel 12. The bars 13 preferably lie generally parallel to each other.

The front face of the housing 10 preferably has, on the lower portion thereof, a power terminal 14 and an external input terminal 15 (AUX-IN terminal). The power terminal 14 may be configured so that an AC power source can be connected thereto via an AC adaptor to power the radio set 1. The external input terminal 15 may serve as a connection terminal for a stereo miniature plug and configured so that a portable audio player 200 via the can be connected cord C in the second connection mode (see FIG. 13) so as to allow communication with the radio set 1.

Figure 4:
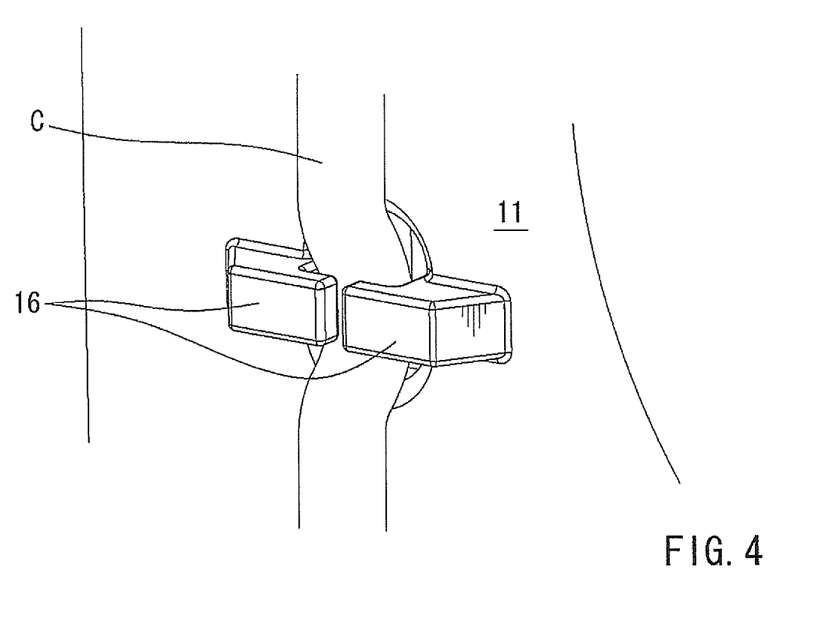
FIG. 4 is a perspective view of a retainer holding a cord.

At upper and lower positions on the left side of the front face of the housing 10, there are preferably provided retainers 16. As shown in FIG. 4, the retainers 16 serve to retain the cord C along the surface of the housing. The cord C may be routed from the external input terminal 15 provided on the lower portion of the front face of the housing 10 to the portable audio player 200 placed on the upper face of the housing 10. The retainers 16 are preferably formed of elastomer, and are preferably molded integrally with the bumper 11 covering the front face of the housing 10.

The upper face of the housing 10 preferably has an attachment device 2 for attaching a portable audio player directly thereto. Here, the term "direct" and "directly" used for attaching is only applied to the case where attaching the audio player is performed without using any connecting cord or cable.

Figure 6:
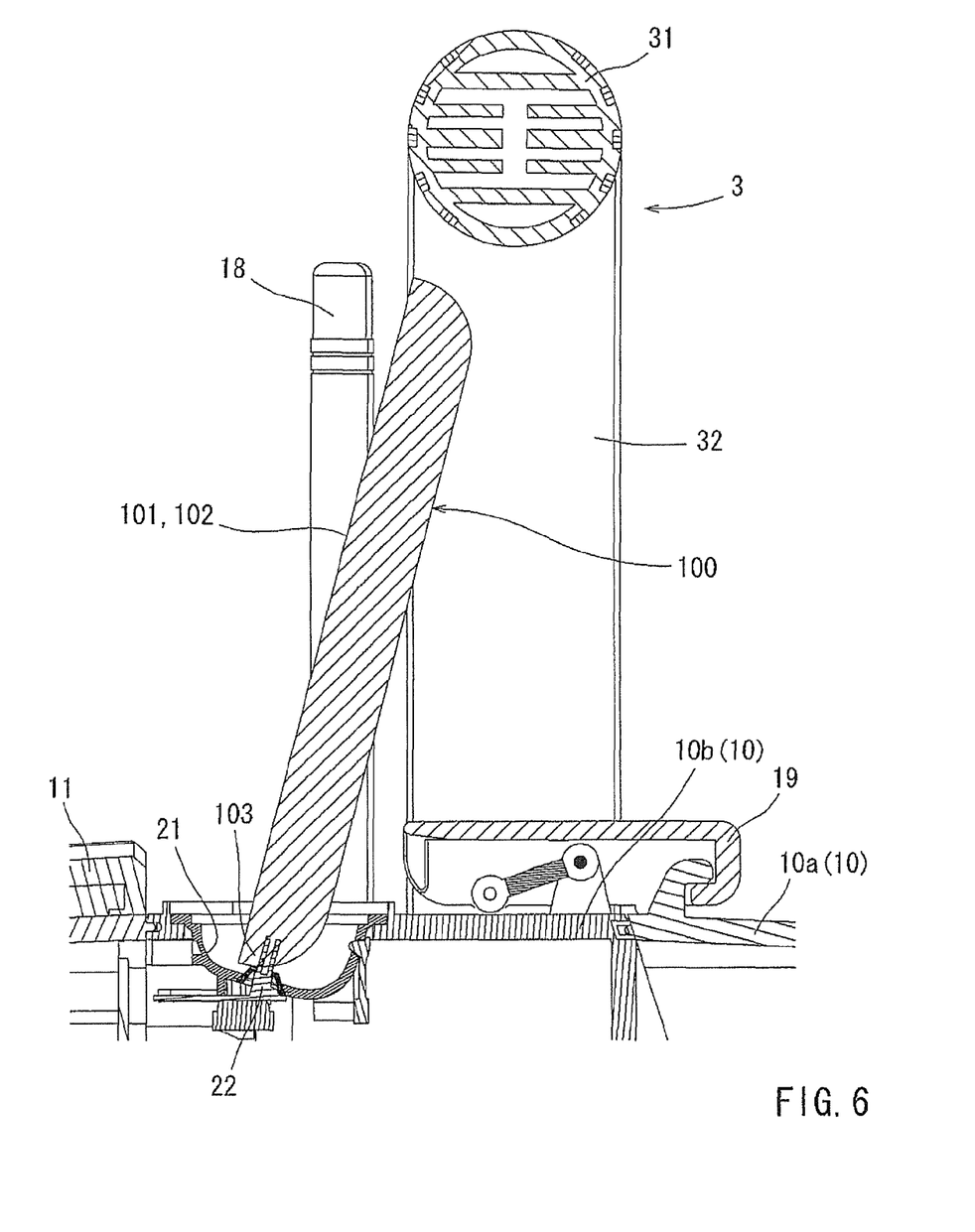
FIG. 6 is a cross-sectional view of the radio set with an iPod connected to the connector.

As shown in FIG. 6, the attachment device 2 preferably has a connector 22 at the bottom of the recess 21. The connector 22 enables a direct connection between the portable audio player 100 and the radio set 1 in the first connection mode.

In the present embodiment, the connector 22 of the radio set 1 is preferably adapted to attach a dock connector 103, which is commonly provided for use with various models of iPods (registered trademark) and iPhones (registered trademark). FIGS. 2, 3, 6, and 8 show an iPod touch (registered trademark) as an example of a portable audio player 100.

As a portable audio player, the audio player 100 may be equipped with a display 101 indicating various kinds of information and an operation panel 102 for operating various kinds of functions. In particular, the iPod touch allows the operation of its functions through direct touching of the display 101, so that the display 101 and the operation panel 102 are at the same position on the case surface. As shown in FIGS. 2 and 3, the audio player 100 is preferably attached to the attachment device 2 so that the operation panel 102 (so the display 101) is visible from the outside, making it possible to perform various functions of the audio player 100 while in the attached state. The audio player 100 connected to the radio set 1 through this attachment makes it possible to perform its various functions also by manipulating the buttons provided on the operation panel 12 of the radio set 1.

The attachment device 2 preferably has a protective cover 23 protecting the connector 22 from water and dust from the outside. The protective cover 23 is preferably connected on the upper face of the housing 10 by a hinge structure 24 so as to allow opening and closing of the recess 21. As shown in FIG. 6, the hinge structure 24 is preferably equipped with a pair of protrusions provided so as to face outwards on the protective cover 23, and a pair of recesses provided so as to face inwards on the housing 10 side; these components may be fit-engaged with each other.

Figure 5:
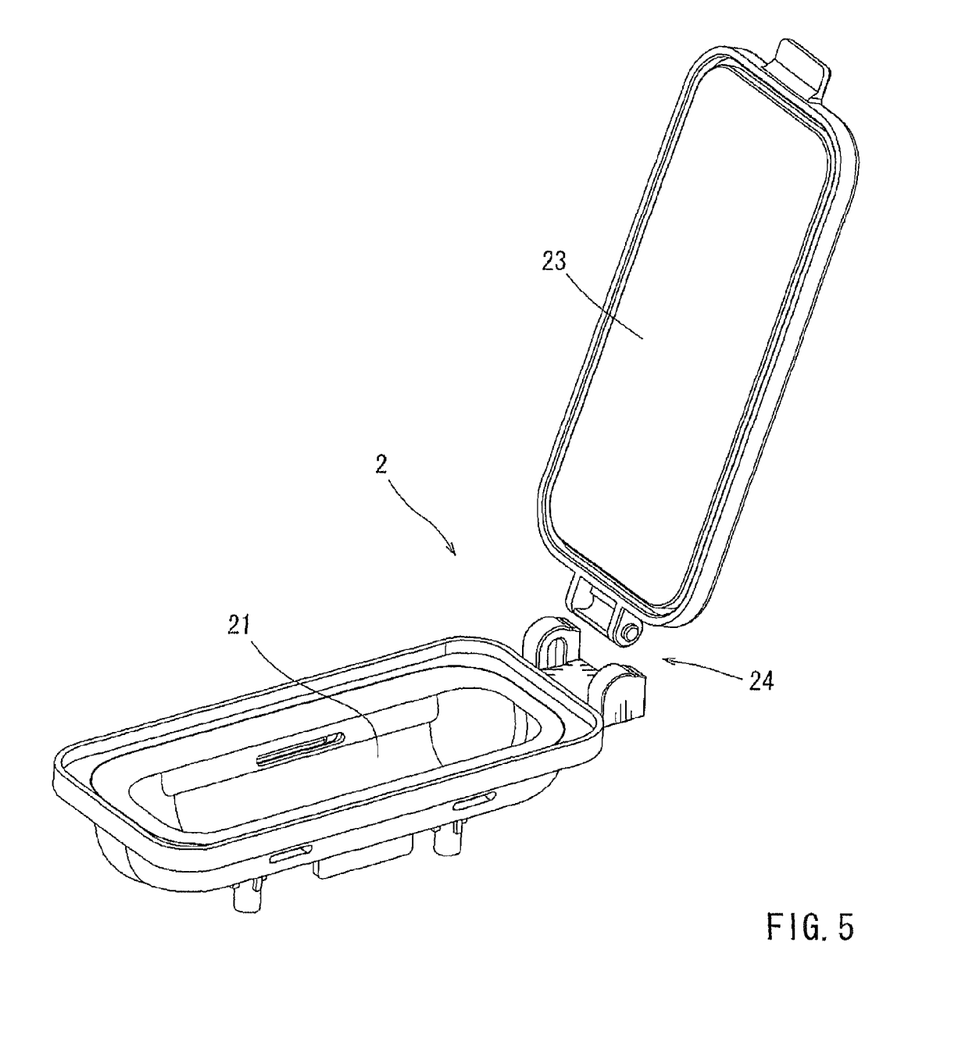
FIG. 5 is a hinge structure connecting the protective cover.

The protective cover 23 rotates upward (to the right as shown in FIG. 5) around the axis to thereby open the recess 21; and through rotation in the reverse direction, it closes the recess 21 so as to be substantially flush with the upper face of the housing 10. As shown in FIG. 3, the opening/closing of the protective cover 23 is preferably accomplished within the width of the upper face of the housing 10. That is, the maximum open position of the protective cover 23, as indicated in the chain double-dashed line in FIG. 3, is generally on the left-hand side of the upward extension of the right-hand side surface of the housing 10, as indicated by the broken line.

Further, the above-mentioned hinge structure 24 is preferably configured such that the protective cover 23 can be detached when an applied load forces the protective cover 23 further beyond the maximum open position. Similarly, detachment may also occur when a load is applied to the protective cover 23 in a direction different from the opening or closing direction thereof.

Figure 7:
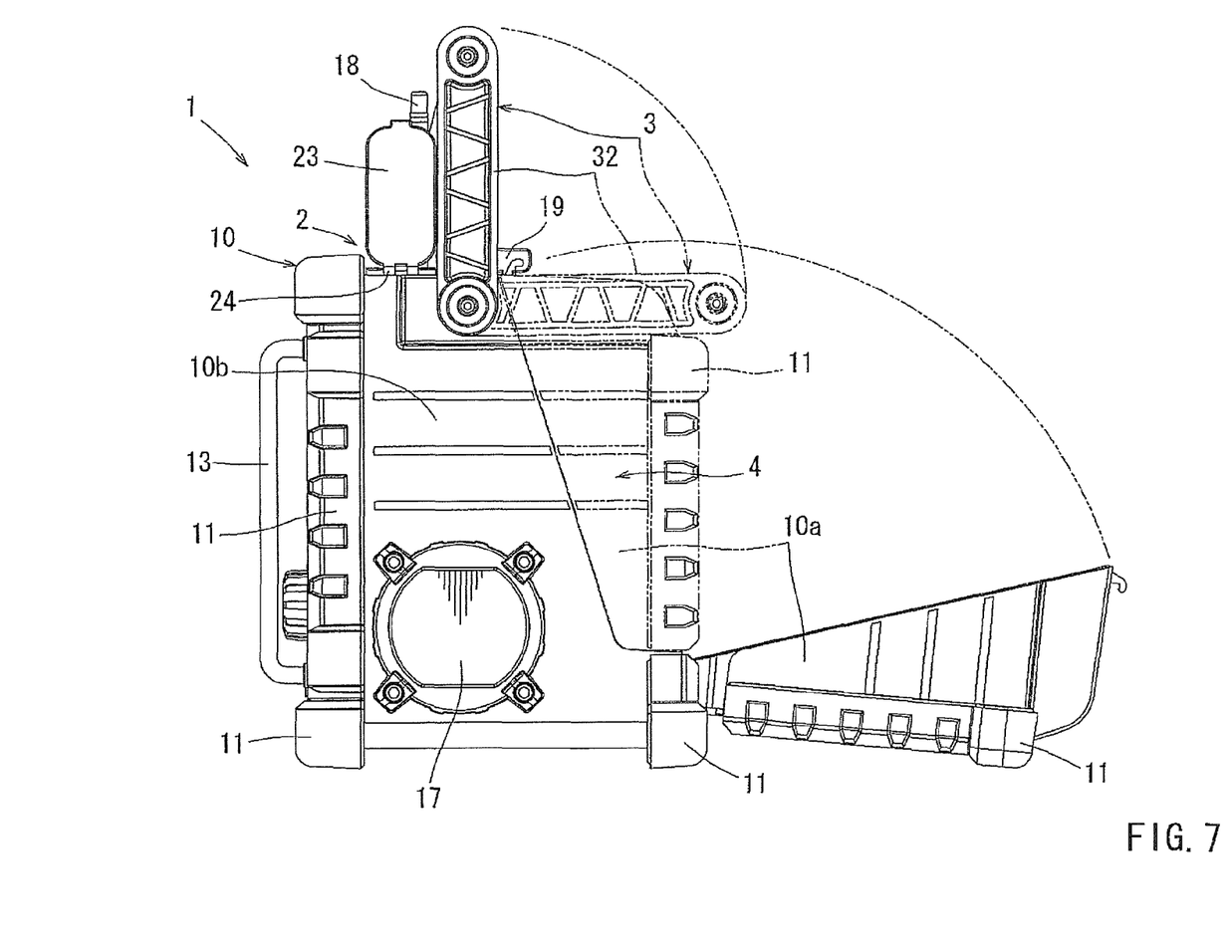
FIG. 7 is a left side view of the housing with a handle and a back lid.

The upper face of the housing 10 preferably has a handle 3 thereon for carrying around the radio set 1. The handle 3 is preferably equipped with a grip 31 for holding the radio set when it is carried about, and support legs 32 supporting the grip 31 with respect to the housing 10. The support legs 32 are provided on the right and left sides of the upper face of the housing 10, and one end of each leg is rotatably connected to the housing 10. The grip 31 horizontally connects the other ends of the right and left support legs 32 to each other. As shown in FIG. 7, the handle 3 may be rotated from the rear to the top within a range of approximately 90 degrees. By being tilted horizontally backwards, the handle 3 is placed in the tucked-away state (See FIG. 1); and, by being raised to the upper position, it can be placed in a functional state (See FIG.

2). When tilted to the horizontal position, the housing 10 becomes substantially flush with the housing 10.

As shown in FIG. 2, when raised to the upper position, the handle 3 is configured to generally cover the portable audio player 100 attached to the attachment device 2. Here, when the handle 3 is at its position where it "generally covers" the audio player 100, the uppermost position of the handle 3 is at least at a position higher than the audio player 100 attached. As is shown in FIG. 3, in the present embodiment, the grip 31 of the handle 3 is preferably situated higher than the top of audio player 100. Further, it is desirable for the handle 3 to generally straddle at least a part of the audio player 100. As is shown in FIG. 5, the attachment device 2 may be provided at a position slightly in front of the handle 3 raised to its upper position on the upper face of the housing 10. The connector 22 with which the attachment device 2 is preferably equipped with, preferably supports the audio player 100 in a backwardly tilted state. As a result, the upper end portion of the audio player 100 attached can be situated within the space surrounded by the handle 3 (the right and left support legs 32 and the grip 31); that is, the handle 3 preferably generally straddles an upper end portion of the audio player 100.

Between the handle 3 and the support shaft, there is provided a means for locking the handle 3 at the above-mentioned upper position. This lock means (not shown) does not itself rotate even in the situation where a load is applied to the handle 3. It imparts rotational resistance between one end of each of the right and left support legs 32 and the housing 10 so that manual rotation is possible.

Next, a battery chamber 4 and a battery mounting mode will be described with reference to FIGS. 6 through 12. As stated above, a battery pack for electric tools can be used to power the radio set 1. The battery pack includes battery cells and a case containing the battery cells.

The rear portion of the housing 10 forms a chamber for accommodating the battery packs. The housing 10 can be generally divided into a back lid 10a and a main body 10b. The back lid 10a includes a major portion of the rear of the housing 10 and a rear portion of the upper face of the housing 10. As shown in FIG. 7, the back lid 10a is hinged on the lower end thereof so that the back lid 10a is rotatable about a horizontal axis and can thereby serve as an opening and closing to the battery chamber 4. As shown in FIG. 6, the main body 10b of the housing 10 has, in the upper portion thereof, a lock portion 19 for locking the back lid 10a in the closed state.

Figure 8:
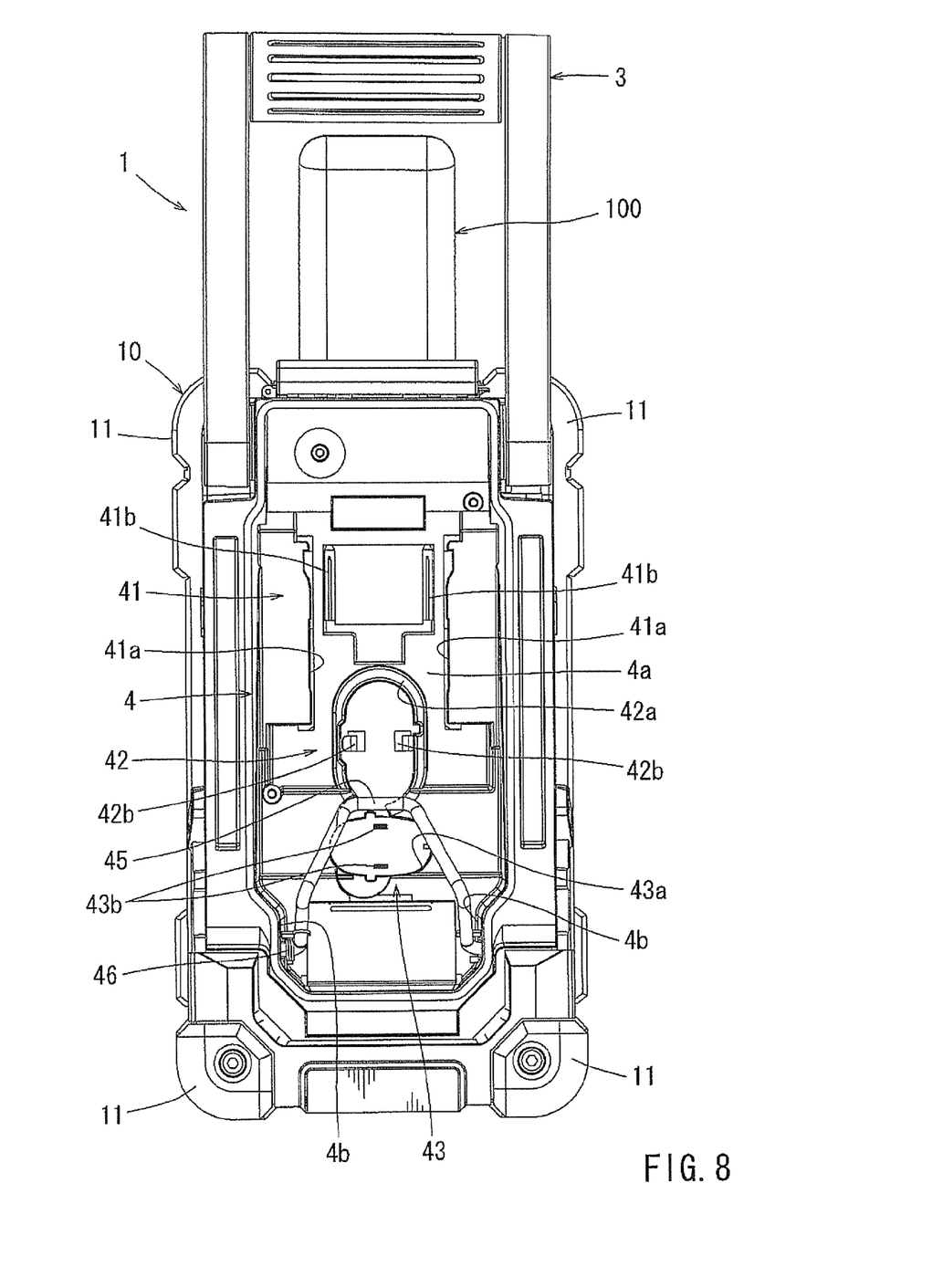
FIG. 8 is a back view of the housing indicating a battery pack chamber.

As shown in FIG. 8, a front wall 4a of the battery chamber 4 preferably has mounts 41, 42, and 43 each for detachably mounting the battery pack on the radio set 1. The battery pack mounted on any of the mounts 41, 42 and 43 is electrically connected to the radio set.

The three mounts 41, 42, and 43 are for the three battery packs differing with each other in configuration. The three battery packs may also differ with respect to cell type, voltage, capacity, etc. The first, second, and third mounts 41, 42, and 43 are arranged in that order from above.

The first mount 41, arranged uppermost, is for mounting the battery pack with a slide configuration (not shown). The first mount 41 has a pair of right and left parallel guides 41a configured to guide the sliding of the battery pack, and an electric terminal 41b provided between them. The slide type battery pack may be mounted by sliding it downwardly along the guides 41a to a locked position where it connects to the terminal 41b.

Figure 10:
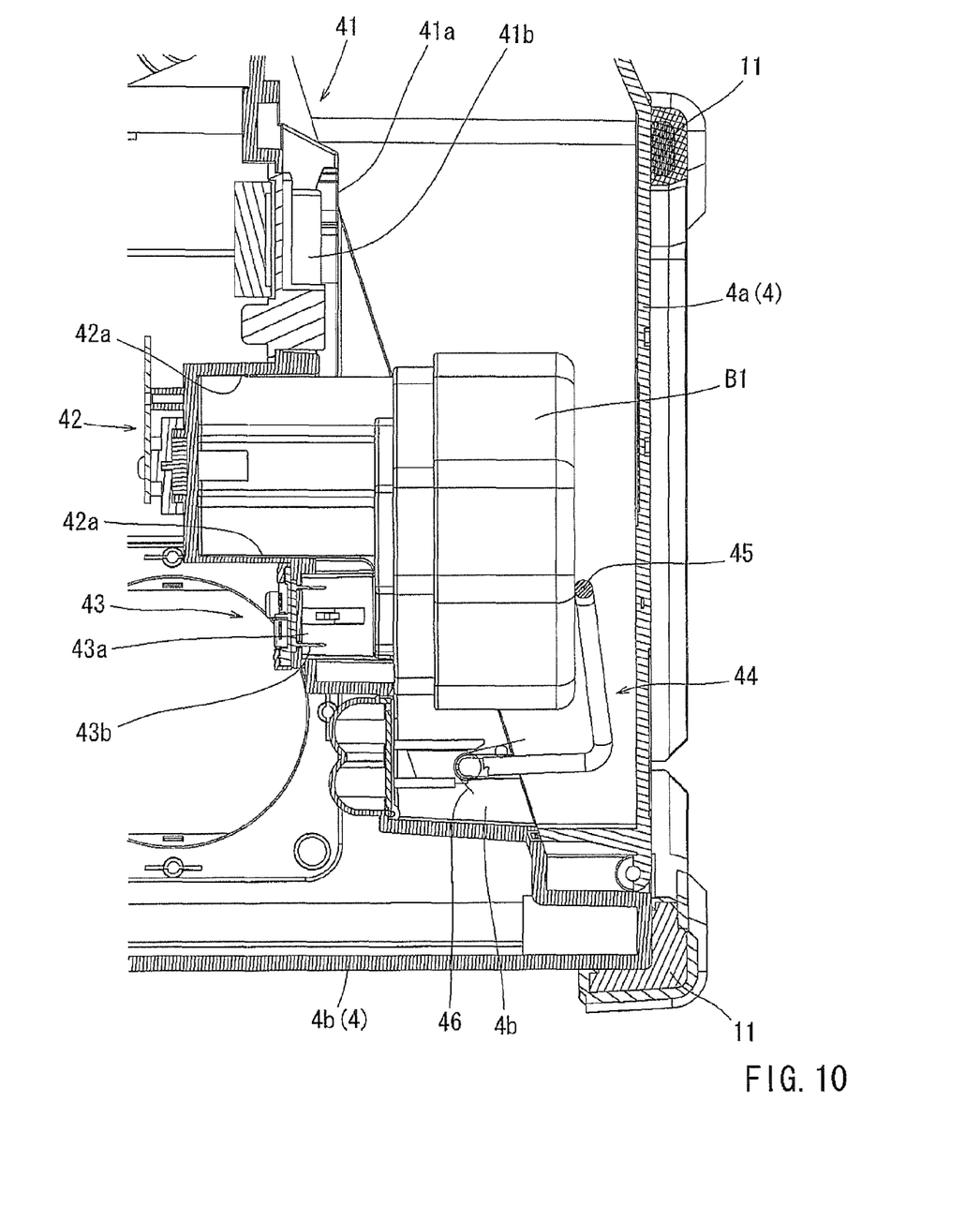
FIG. 10 is a cross-sectional view of the housing with an insertion type battery pack mounted on a (second) mount.

The second and third mounts 42 and 43 are for the battery packs of an insertion type. FIG. 10 shows an insertion type battery pack B1 mounted to the second mount 42, and FIGS. 11 and 12 respectively show other insertion type battery packs B2 and B3 mounted to the third mount 43. The second and third mounts, 42 and 43 respectively, have horizontal insertion holes 42a and 43a configured to guide the inserted portions of the battery packs. Electrical terminals 42b and 43b are preferably provided in the depths of the holes. The insertion type battery packs are inserted forward into the holes 42a and 43a up to the positions where they can be connected to the terminals 42b and 43b.

Figure 11:
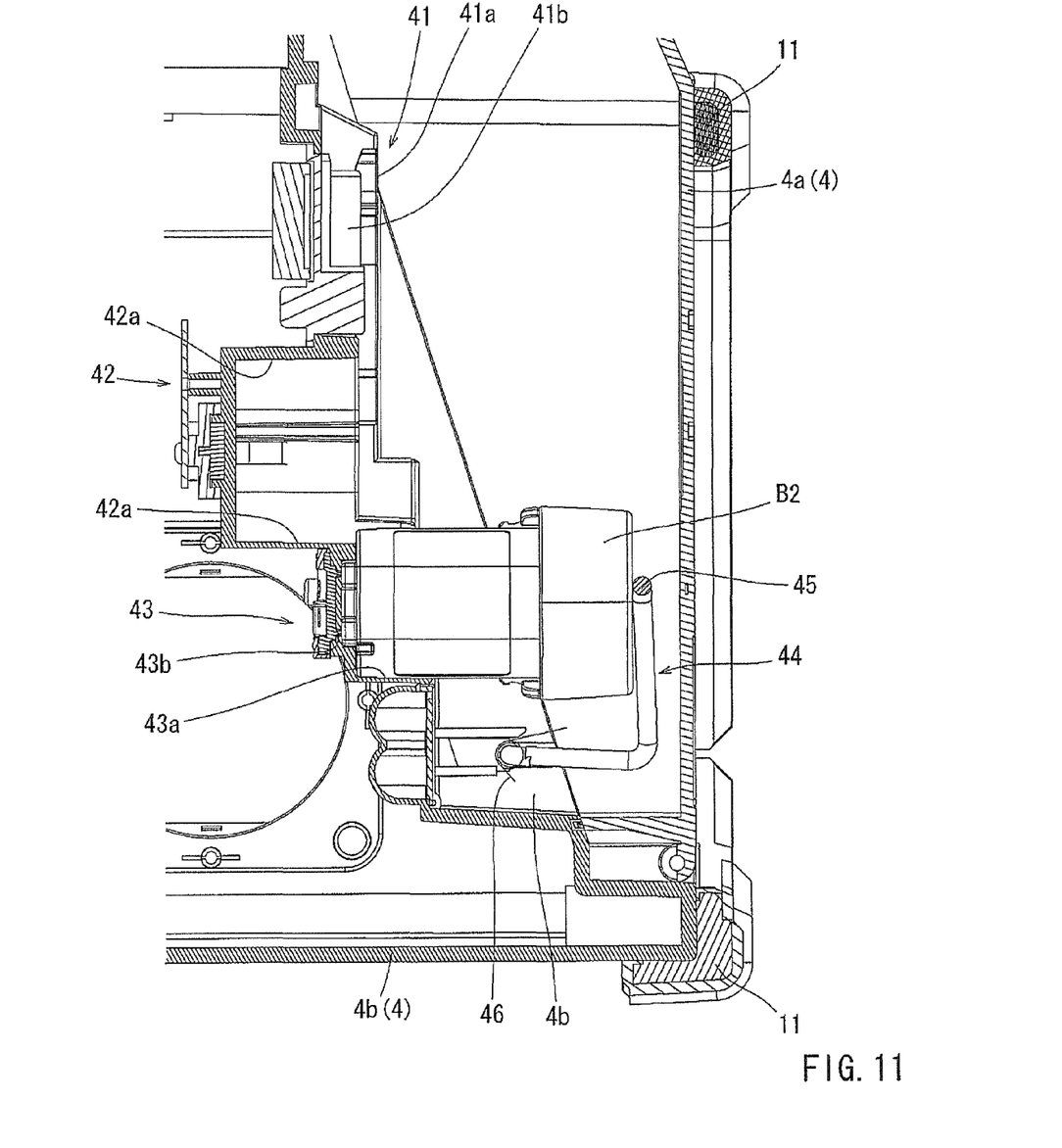
FIG. 11 is a cross-sectional view of the housing with another insertion type battery pack mounted on a (third) mount.
Figure 12:
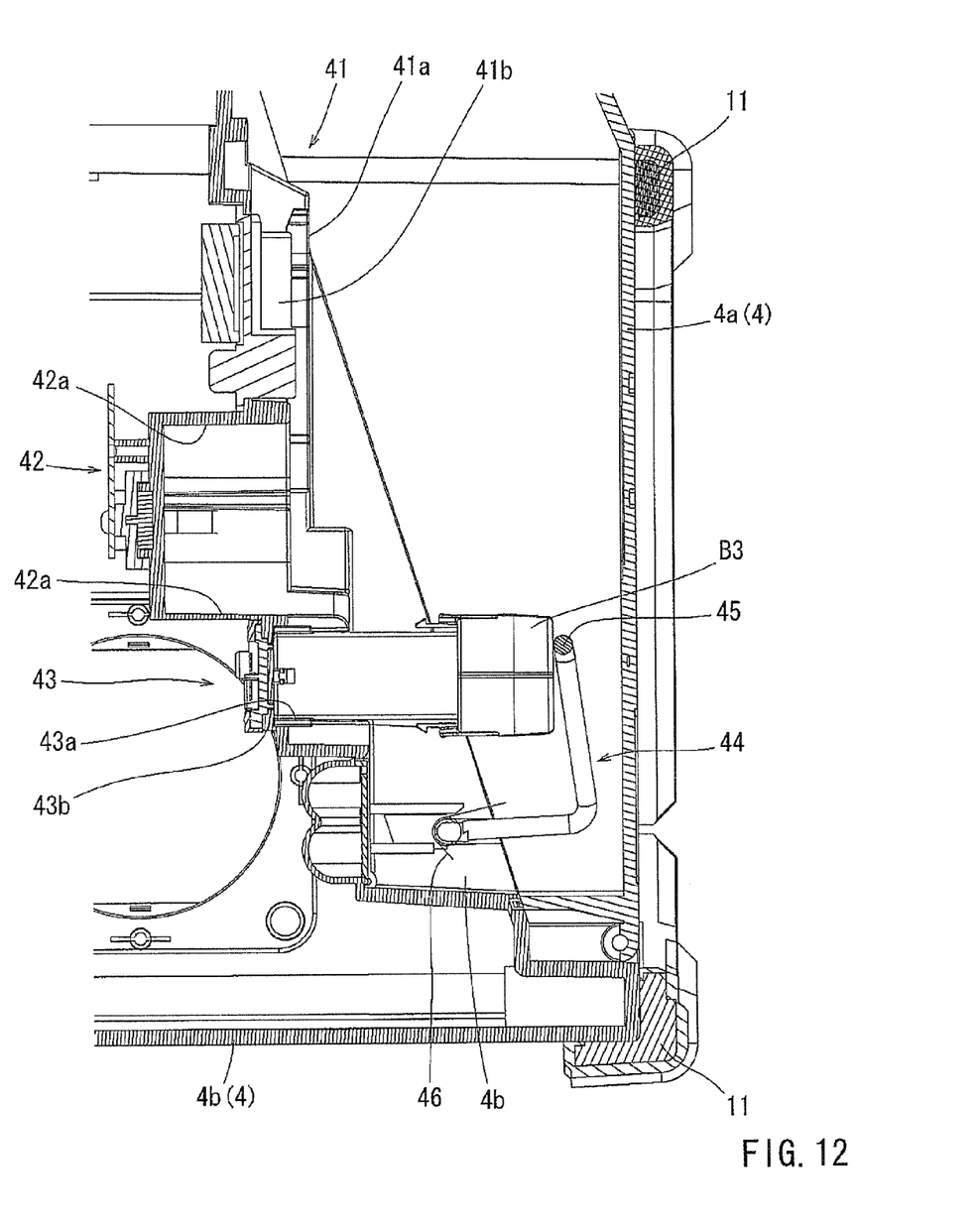
FIG. 12 is a cross-sectional view of the housing with another insertion type battery pack mounted on the (third) mount; the battery pack has an inserted portion of a different configuration from the battery pack as in FIG. 11.

The inserted portions of the battery packs B2 and B3 may have different configurations with each other. The hole 43a of the third mount 43 is preferably formed with a configuration fit for these two different configurations. Battery packs of the same insertion type have their inserted portions of the same configuration, but may have different configurations.

Figure 9:
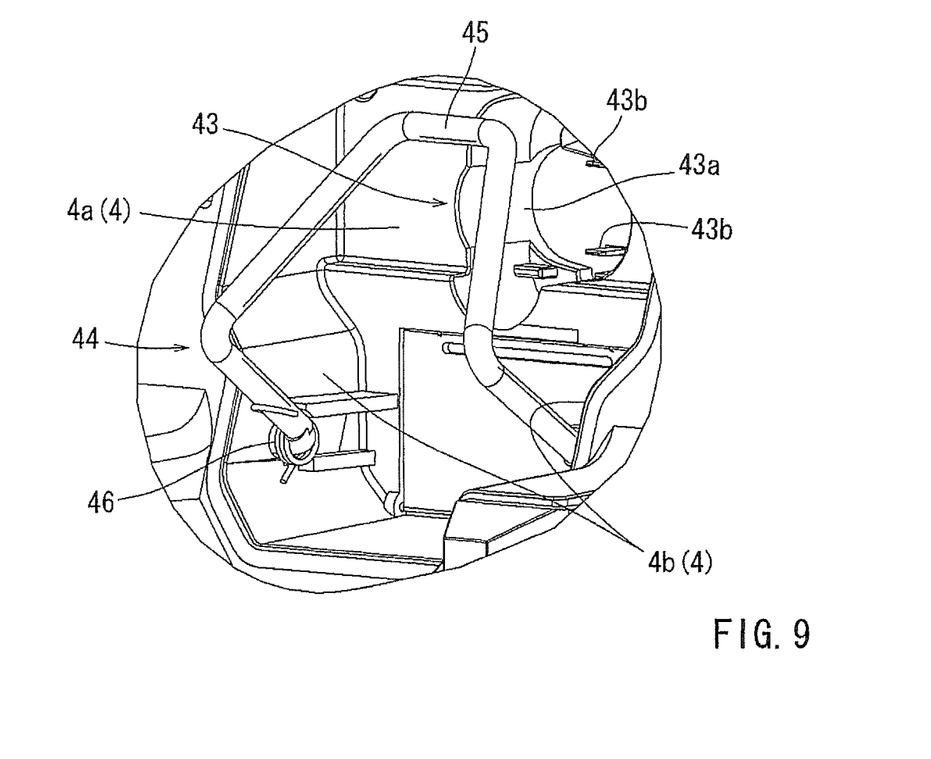
FIG. 9 is an enlarged perspective view of a detachment preventing means.

On the inner wall of the battery chamber 4, there is provided a means for preventing the insertion type battery packs B1, B2, and B3 from being detached from the mounts. The detachment preventing means 44 holds any of the battery packs B1, B2, and B3 inserted in the hole. The detachment preventing means 44 has a presser member 45 that preferably contacts the back surface of the battery pack when it is inserted, and a torsion spring 46 configured to urge the presser member 45 to cause it to press the battery pack in the inserting direction.

The presser member 45 is preferably formed of a metal wire, and the both ends of the wire are preferably rotatably supported on both the right and left side walls 4b of the battery chamber 4. The presser member 45 is preferably bent so that an intermediate portion thereof can be held in contact with the back surface of any of the battery packs B1, B2, and B3 inserted. The presser member 45 is positioned and configured so that, whichever one of the battery packs B1, B2, and B3 may be inserted, it can be brought into contact with the battery pack.

Next, a circuit configuration of the present radio set 1 will be illustrated. As shown in FIG. 13, the present radio set 1 may be equipped with an input device 51 including a reception device, a processing device 52, and a sound output device 53 including an amplifier. The reception device receives the radio waves of radio broadcast by an antenna 18, and produces a sound signal via a tuning circuit, a detection circuit, etc. The processing device 52 controls the operation panel 12 and the input/output of the portable audio player 100 connected in the first connection mode, and processes the sound signal, controls power source, etc. The amplifier amplifies the sound signal input from the reception device or the portable audio players 100 and 200. The sound signal amplified by the amplifier is input to speakers 17 provided on both the right and left side surfaces of the housing 10, and is reproduced as sound.

As described above, the portable radio set 1 is powered by any of the rechargeable battery packs B1, B2, and B3 for electric tools, and suitable for use in a job site environment, such as one that exists outdoors. The radio set 1 preferably includes a box-shaped housing 10 having an upper face, a sound output device 53 reproducing sound, and a connector 22 (attachment device) provided on the upper face of the housing 10. The connector 22 is preferably configured so that the portable audio player 100 can be directly attached thereto. The connector 22 allows the sound output device 53 to communicate with the audio player 100 which is attached thereto, and thereby enables the sound output device 53 to retrieve the sound data stored in the audio player 100 and reproduce it as sound. The portable audio player 100 is preferably situated above the housing 10, which facilitates handling of the portable audio player 100, including the attaching to and detaching from the connector 22.

The connector 22 (attachment device) is preferably disposed so that the display 101 or the operation panel 102 of the audio player 100 attached thereto is visible from the outside. This further helps to facilitate handling and operation of the portable audio player 100.

The radio set 1 further preferably includes the protective cover 23 protecting the connector 22 (attachment device) from the outside when no portable audio player is attached to the connector 22. More specifically, the recess 21 where the connector 22 is preferably provided is covered. Therefore, it is possible to prevent or mitigate intrusion of water and dust into the attachment device 2 in the job site environment, making it possible, in particular, to protect the communication function and attachment function of the connector 22.

The radio set 1 further preferably includes a hinge structure 24 connecting the protective cover 23 to the housing 10 so that the cover can open and close the connector 22 (attachment device). The hinge structure 24 is preferably configured to limit the movement of opening and closing of the protective cover 23 within the range of the width of the upper face of the housing 10. Thus, the protective cover 23, when opened to the limit, does not protrude beyond the upper extension of the side face of the housing 10, so that even if the radio set 1 falls on its right face the protective cover 23 does not come into contact with the floor, the ground, etc. Accordingly, it is possible to suppress detachment of the protective cover 23 from the housing 10.

Further, the hinge structure 24 allows the protective cover 23 to be detached from the housing by an excessive load applied thereto. The excessive force may arise, for example, as a result of a collision with a dropping object, or falling of the radio set 1 to the floor or the ground. The excessive load may include a further load in the opening direction beyond the opening limit position, or a load in a direction different from the opening or closing direction. Accordingly, if an excessive load should be applied to the protective cover 23, the protective cover 23 can be detached from the housing 10. This makes it possible to prevent the protective cover 23 from suffering damage.

The radio set 1 further may include a carrying handle 3 provided on the upper face of the housing 10. The handle 3 may be disposed so as to cover the portable audio player 100 which is attached to the connector 22 (attachment device). More specifically, when the handle 3 is raised to the upper position, the handle 3 preferably covers the portable audio player 100. Therefore, it is possible to protect the portable audio player 100 from a dropping object or the like in the job site environment. This makes it possible to prevent damage to the portable audio player 100.

Further, when raised to the upper position, the handle 3 is preferably locked to the upper position by a lock device. Thus, even if the handle 3 receives a load, it does not rotate of itself, making it possible to maintain the covered state of the portable audio player 100. Accordingly, it is possible to further protect the portable audio player 100 from a dropping object or the like.

The upper face of the housing 10 may be configured to allow a portable audio player to be placed thereon. The radio set 1 further may include an external input terminal 15 (connection terminal) configured so that the portable audio player 100 can be electrically connected thereto via a cord C whereby the sound output device can communicate with the portable audio player 100. The cord C may be routed from the portable audio player placed on the upper face to the external input terminal. The external input terminal 15 is preferably provided at a position on the housing 10 which is not on the upper face. The radio set 1 further includes a retainer retaining the cord C along the surface of the housing 10. Therefore, it is possible to suppress inadvertent contact with the cord C by the worker walking around the radio set 1 in the job site environment and the materials carried about around the same. Thus, it is possible to prevent the radio set 1 from toppling over, making it possible to suppress damage of the radio set 1 and of the portable audio player 200.

Further, the radio set 1 preferably further includes the mounts 43 for detachably mounting the power source battery, and a detachment prevention device making it possible to press the power source battery pack in the mounting direction to prevent it from being detached from the mount 43. A plurality of power source battery packs B2 and B3 of different configurations are detachable with respect to the mounts 43. The detachment prevention device can prevent detachment of any of the plurality of power source battery packs B2 and B3 of whatever configuration mounted to the mounts 43. Therefore, it is possible to prevent detachment of power source battery packs B2 and B3 of whatever configuration from the mounts 43 due to vibration or the like in the job site environment.

While the embodiments of invention have been described with reference to specific configurations, it will be apparent to those skilled in the art that many alternatives, modifications and variations may be made without departing from the scope of the present invention. Accordingly, embodiments of the present invention are intended to embrace all such alternatives, modifications and variations that may fall within the spirit and scope of the appended claims. For example, embodiments of the present invention should not be limited to the representative configurations, but may be modified, for example, as described below.

The attachment device 2 may be the one which simply physically attaches the portable audio player 100 to the upper face of the housing 10. Such an attachment device 2 would not function to electrically connect the radio set 1 to the audio player 100. In this case, electrical connection may occur, for example, through the use of another connection terminal (including the external input terminal 15) different from the attachment device 2. In other words, in the connection mode described above, instead of using the portable audio player 200 placed on the upper face of the housing 10, it is also possible to attach the portable audio player 200 to the upper face of the housing 10 by an attachment device (having no electrically connecting function) provided on the upper face of the housing 10.

While it is the operation panel 102 and the display 101 of the portable audio player 100 that are visible from the outside in the attached state, it is also possible for only one of them to be visible from the outside. Alternatively, it is possible to use a portable audio player 100 having only one of them. When the operation panel 102 is visible, the handling of the portable audio player 100 is facilitated, whereas, when the display 101 is visible, the checking of various items of information is facilitated.

As used herein, the term "portable audio player" is used to refer to any portable apparatus which is capable of outputting sound data recorded in its internal memory as a sound signal. This means that the portable audio player is not restricted to an iPod (registered trademark) or an iPhone (registered trademark). The attachment device is not restricted to one that connects to an iPod (registered trademark) or iPhone (registered trademark), and may be for use with a portable audio player 100 different from them. Further, the portable audio player can be a general-purpose USB flash memory drive, and the connector 22 may be a USB terminal.

The radio set may be not only an analog radio set configured to receive AM and FM broadcast, but also a digital radio set receiving digital broadcast, an Internet radio set connected to the Internet via a wireless LAN such as Wi-Fi to receive radio contents, or a combination of a plurality of such radio sets. In the case of an Internet radio set, the processing device 52 may perform bi-directional communication by a wireless LAN via the antenna 18. In an urban area where there are many lofty buildings constituting an obstacle to the reception of AM and FM broadcast, an Internet radio set works more advantageously since many access points are available.

This invention claims:

1. A portable radio set powered by a rechargeable battery for electric tools, suitable for use at a job site comprising:
   a box-shaped housing having an upper face;
   a sound output device for reproducing sound;
   a carrying handle provided on the upper face of the housing; and
   an attachment device configured so that a portable audio player can be directly attached thereto;
   a protective cover for protecting the attachment device; and
   a hinge structure connecting the protective cover to the housing so that the cover can open and close, wherein
   the attachment device allows the sound output device to communicate with the audio player when attached thereto, whereby the sound output device can reproduce sound data stored in the audio player as sound,
   the attachment device is situated on the upper face of the housing,
   the carrying handle comprises a grip and support legs supporting the grip with respect to the housing, the carrying handle being adapted to be raised to an upper position in which the grip is situated higher than a top of an attached portable audio player such that the handle straddles at least part of the attached portable audio player, and
   the hinge structure is configured to limit the movement of opening and closing of the protective cover within a range within a width of the upper face of the housing.

2. The radio set as in claim 1, wherein the attachment device is disposed so that a display or an operation panel of the audio player which is attached thereto is visible from the outside.

3. The radio set as in claim 1, wherein the hinge structure allows the protective cover to be detached from the housing by an excessive load applied thereto.

4. The radio set as in claim 1, wherein the upper face of the housing is configured to allow a portable audio player to be placed thereon, and the radio set further comprising:
   a connection terminal configured so that the portable audio player can be connected thereto via a cord whereby the sound output device can communicate with the portable audio player, the connection terminal provided at a position on the housing which is not on the upper face, and the cord is routed from the portable audio player placed on the upper face to the connection terminal; and
   a retainer retaining the cord along the surface of the housing.

5. A portable radio set powered by a rechargeable battery for electric tools, suitable for use at a job site comprising:
   a box-shaped housing having an upper face;
   a sound output device for reproducing sound;
   a carrying handle provided on the upper face of the housing;
   an attachment device configured so that a portable audio player can be directly attached thereto;
   a protective cover for protecting the attachment device; and
   a hinge structure connecting the protective cover to the housing so that the cover can open and close, wherein
   the attachment device allows the sound output device to communicate with the audio player when attached thereto, whereby the sound output device can reproduce sound data stored in the audio player as sound,
   the attachment device is situated on the upper face of the housing,
   the carrying handle comprises a grip and support legs supporting the grip with respect to the housing, the carrying handle being adapted to be raised to an upper position in which the grip is situated higher than a top of an attached portable audio player such that the handle straddles at least part of the attached portable audio player, and
   the hinge structure is configured to limit the movement of opening and closing of the protective cover within a range within a width of the upper face of the housing, the width being a direction substantially parallel to a front side face of the housing.

6. A portable radio set powered by a rechargeable battery for electric tools, suitable for use at a job site comprising:
   a box-shaped housing having an upper face;
   a sound output device for reproducing sound;
   a carrying handle provided on the upper face of the housing;
   an attachment device configured so that a portable audio player can be directly attached thereto;
   a protective cover for protecting the attachment device; and
   a hinge structure connecting the protective cover to the housing so that the cover can open and close, wherein
   the attachment device allows the sound output device to communicate with the audio player when attached thereto, whereby the sound output device can reproduce sound data stored in the audio player as sound,
   the attachment device is situated on the upper face of the housing,
   the carrying handle comprises a grip and support legs supporting the grip with respect to the housing, the carrying handle being adapted to be raised to an upper position in which the grip is situated higher than a top of an attached portable audio player such that the handle straddles at least part of the attached portable audio player, and
   the hinge structure is configured to limit the movement of opening and closing of the protective cover within a range defined by the upper face of the housing.

7. The radio set as in claim 6, wherein the hinge structure limits the movement of opening and closing of the protective cover in a direction substantially parallel to a surface of a side face of the housing.

\* \* \* \* \*